(12) United States Patent
Lubbers et al.

(10) Patent No.: US 10,691,899 B2
(45) Date of Patent: Jun. 23, 2020

(54) CAPTIONING A REGION OF AN IMAGE

(71) Applicant: DASSAULT SYSTEMES, Velizy Villacoublay (FR)

(72) Inventors: Niels Lubbers, Velizy Villacoublay (FR); Malika Boulkenafed, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 122 days.

(21) Appl. No.: 15/969,548

(22) Filed: May 2, 2018

(65) Prior Publication Data
US 2018/0329892 A1 Nov. 15, 2018

(30) Foreign Application Priority Data
May 2, 2017 (EP) ..................................... 17305486

(51) Int. Cl.
| | | |
|---|---|---|
| *G06F 40/40* | (2020.01) |
| *G06K 9/00* | (2006.01) |
| *G06K 9/62* | (2006.01) |
| *G06N 3/04* | (2006.01) |
| *G06N 3/08* | (2006.01) |

(52) U.S. Cl.
CPC ......... *G06F 40/40* (2020.01); *G06K 9/00671* (2013.01); *G06K 9/627* (2013.01); *G06K 9/6262* (2013.01); *G06N 3/0445* (2013.01); *G06N 3/0454* (2013.01); *G06N 3/08* (2013.01)

(58) Field of Classification Search
CPC ........ G06F 17/28; G06N 3/08; G06N 3/0454; G06N 3/0445; G06K 9/6262; G06K 9/627; G06K 9/00671; G06T 11/60
See application file for complete search history.

(56) References Cited

U.S. PATENT DOCUMENTS

| | | | | |
|---|---|---|---|---|
| 2010/0111370 A1* | 5/2010 | Black | ................. | G06K 9/00369 382/111 |
| 2016/0140435 A1 | 5/2016 | Bengio et al. | | |
| 2016/0342895 A1* | 11/2016 | Gao | ..................... | G06F 17/2881 |
| 2017/0132526 A1* | 5/2017 | Cohen | .................. | G06N 3/0454 |

(Continued)

FOREIGN PATENT DOCUMENTS

WO 2016/077797 A1 5/2016

OTHER PUBLICATIONS

European Search Report dated Oct. 17, 2017 in Application No. 17305486.7-1901, 6 pages.

(Continued)

*Primary Examiner* — Qian Yang
(74) *Attorney, Agent, or Firm* — Oblon, McClelland, Maier & Neustadt, L.L.P.

(57) ABSTRACT

A computer implemented method for learning a function configured for captioning a region of an image. The method comprises providing a dataset of triplets each including a respective image, a respective region of the respective image, and a respective caption of the respective region. The method also comprises learning, with the dataset of triplets, a function that is configured to generate an output caption based on an input image and on an input region of the input image. Such a method constitutes an improved solution for captioning a region of an image.

16 Claims, 10 Drawing Sheets

(56) References Cited

U.S. PATENT DOCUMENTS

2017/0140245 A1* 5/2017 Kraft ................... G06K 9/6218
2017/0200065 A1* 7/2017 Wang ....................... G06N 3/08

OTHER PUBLICATIONS

Ranjay Krishna et al., "Visual Genome Connecting Language and Vision Using Crowdsourced Dense Image Annotations", 44 pages, Feb. 23, 2016.

Ryan Kiros et al., "Unifying Visual-Semantic Embeddings with Multimodal Neural Language Models", 13 pages, Nov. 10, 2014.

Rémi Lebret et al., "Phrase-based Image Captioning", 9 pages, Apr. 9, 2015.

Ryan Kiros et al., "Multimodal Neural Language Models", 14 pages, 2014.

Tomas Mikolov et al., "Distributed Representations of Words and Phrases and their Compositionality", 9 pages, 2013.

Jeff Donahue et al., "Long-term Recurrent Convolutional Networks for Visual Recognition and Description", 14 pages, May 31, 2016.

Oriol Vinyals et al., "Show and Tell: A Neural Image Caption Generator", 9 pages, Apr. 20, 2015.

Andrej Karpathy et al., "Deep Visual-Semantic Alignments for Generating Image Descriptions", 17 pages, Jun. 7, 2015.

Justin Johnson et al., "Dense Cap: Fully Convolutional Localization Networks for Dense Captioning", 10 pages, Jun. 27, 2016.

Kishore Papineni et al., "BLEU: a Method for Automatic Evaluation of Machine Translation", Proceedings of the 40$^{th}$ Annual Meeting of the Association for Computational Linguistics (ACL), Philadelphia, pp. 311-318 (8 pages), Jul. 2002.

Michael Denkowski et al., "Meteor Universal: Language Specific Translation Evaluation for Any Target Language", 5 pages. Jun. 26-27, 2014.

Ilya Sutskever et al., "Sequence to Sequence Learning with Neural Networks", 9 pages, 2014.

\* cited by examiner

CAPTIONING A REGION OF AN IMAGE

CROSS-REFERENCE TO RELATED APPLICATIONS

This application claims priority under 35 U.S.C. § 119 or 365 to European Application No. 17305486.7, filed May 2, 2017. The entire contents of the above application(s) are incorporated herein by reference.

FIELD OF THE INVENTION

The invention relates to the field of computer programs and systems, and more specifically to methods, devices, data structures and programs related to learning a function configured for captioning a region of an image.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, scene understanding and image captioning are gaining wide importance. Image captioning is a problem at the intersection of computer vision and natural language processing and consists in, given an input image, generating a caption to describe the input image. Region captioning is a particular kind of image captioning that consists in, given an input image and an input region of interest inside the input image, generating a caption to describe the input region. Dense captioning is an approach going a step further: it consists in automatically finding the different regions of interest in an image and giving a description to each of them. These techniques may be useful in scene understanding applications, for example by providing for automatic generation of 3D experiences from an image.

The following papers relate to image captioning and are referred to hereunder:

[1] R. Krishna et al. *Visual Genome: Connecting Language and Vision Using Crowdsourced Dense Image Annotations*, arXiv 2016
[2] R. Kiros et al. *Unifying Visual-Semantic Embeddings with Multimodal Neural Language Models*, ICCV 2015
[3] R. Lebret et al. *Phrase-Based Image Captioning*, 2015
[4] R. Kiros et al. *Multimodal Neural Language Models*, ICML 2014
[5] T. Mikolov et al. *Distributed Representations of Words and Phrases and their Compositionality*, NIPS 2013
[6] S. Venugopalan et al. *Long-term Recurrent Convolutional Networks for Visual Recognition and Description*, CVPR 2015
[7] O. Vinyals et al. *Show and Tell: A neural Image Caption Generator*, IEEE 2015
[8] A. Karpathy et al. *Deep Visual-Semantic Alignments for Generating Image Descriptions*, IEEE 2015
[9] A. Karpathy et al. *DenseCap: Fully Convolutional Localization Networks for Dense Captioning*, CVPR 2016
[10] K. Papineni et al. *BLEU: a Method for Automatic Evaluation of Machine Translation*, ACL 2002
[11] M. Denkowski et al. *Meteor Universal: Language Specific Translation Evaluation for Any Target Language* ACL 2014
[12] I. Sutskever et al. *Sequence to Sequence Learning with Neural Networks*, NIPS 2014

Existing image captioning techniques are based on a database that consists of pairs of image/caption used to train a machine learning model (i.e. function) configured to generate the captions. Such a database may be obtained from a crowdsourcing platform where people are asked to write captions describing pictures. Existing databases include MSCOCO for image captioning and Visual Genome [1] for dense captioning. Existing approaches for captioning then consist of two categories: sentence retrieval from a learned multimodal space and sentence generation thanks to the encoder/decoder framework. In both approaches, the input image in the model is encoded and an image signature is retrieved. Then, a caption is retrieved after processing that signature. Evaluation of the quality of the generated captions may be performed by different language metrics [10, 11].

In the multimodal approach [2, 3, 4], a common space for image and phrase representations is learned. Such a common space is like an embedding space for two modalities, images and text, which is learned using techniques such as negative sampling as used in [5] when learning Word2Vec™. Once such a space is learned, the process of sentence generation is executed after having retrieved captions whose signatures are the most similar to the image query signature in the embedding space. A problem with such an approach is that the captions obtained are very biased by the captions already present in the database. Moreover, the retrieval of the most similar captions is an operation that can be very time consuming if the database becomes too large.

In the second approach, an encoder/decoder framework is used for sentence generation [6, 7, 8]. In the first step of encoding the image, a signature of the image is obtained after passing the image through a convolutional neural network and taking the output of some of the higher fully connected layers. Then, as in the general approach developed in [12], the image signature is decoded thanks to a recurrent neural network that generates the sentence word after word. The task of dense captioning also uses the encoder/decoder framework as described above when generating captions of the regions in the image. State of the art method [9] integrates a localization layer inside the neural network to automatically find the regions of interest in the image. Those approaches work well for entire image description, as long as the quality of the database they are trained on is good enough. However, the same models used to generate captions for regions inside an image do not give results as good as in the entire image.

Thus, there still exists a need of an improved solution for captioning a region of an image.

SUMMARY OF THE INVENTION

It is therefore provided a computer implemented method for learning a function. The method comprises providing a dataset of triplets. Each triplet includes a respective image, a respective region of the respective image, and a respective caption of the respective region. The method also comprises learning, with the dataset of triplets, a function that is configured to generate an output caption based on an input image and on an input region of the input image. The function is thereby configured for captioning a region of an image.

The captioning may be performed relatively fast, e.g. substantially real-time, as the function is pre-learned to already generate an output caption based on an input image and on an input region of the input image. Furthermore, compared to the prior art, the function is configured for performing a captioning of a relatively high quality and/or with relatively high robustness. In other words, a caption outputted by the method describes the input region of the input image relatively accurately and using a relatively syntactically and/or grammatically correct language, and/or with relatively high robustness with respect to the quality of the dataset used for the learning. This is thanks to the learning being performed with a dataset of triplets including not only regions of images and corresponding captions, but also the images that include the regions themselves, such that the function generates an output based not only on information of an input region but also on information of an input image that includes the input region. In other words, the method takes advantage of the context of a region, that is, the image it is included in, in order to increase the quality of the captioning.

This is unlike known methods for region description, where the process of sentence generation uses information from the inside of the region only and not its surrounding. This means a lack of context information based upon when generating the captions. Moreover, known trained models are very sensitive to the database they were trained on.

The method may comprise one or more of the following:
- the function includes a first component, the first component being configured to determine a signature of a combination of the input image and of the input region, and a second component, the second component being configured to generate the output caption based on the signature of the combination;
- the second component is configured to generate the output caption iteratively;
- the second component includes one or more recurrent neural networks;
- the one or more recurrent neural networks comprise one or more Long Short-Term Memory neural networks;
- the second component is configured to generate the output caption further based on a word embedding space;
- the second component comprises a first recurrent neural network, a second recurrent neural network and a word embedding layer, and, the first recurrent neural network is configured to recurrently generate a respective output word embedding vector based on a respective input word embedding vector, the input word embedding vector respective to the first recurrent neural network being the output of the compound of the second recurrent neural network and then the word embedding layer, the second recurrent neural network is configured to recurrently generate a respective output word embedding vector based on a respective input word embedding vector and on the signature of the combination, the input word embedding vector respective to the second recurrent neural network being the output of the first recurrent neural network, and the word embedding layer is configured to generate a respective output word embedding vector based on a respective input word embedding vector, the generated word embedding vector respective to the word embedding layer being the word embedding vector corresponding to a word of a vocabulary represented in the word embedding space which is the word with highest probability;
- the method comprises providing a dataset of captions, the learning including training the first recurrent neural network and/or the word embedding layer with the dataset of captions, and then training the second recurrent neural network;
- the first component includes a component configured to extract a signature of the input image, a component configured to extract a signature of the input region, and a component configured to combine the signature of the input image with the signature of the input region;
- the component configured to extract a signature of the input image and the component configured to extract a signature of the input region are respective convolutional neural networks;
- the respective convolutional neural networks share weights;
- the component configured to combine the signature of the input image with the signature of the input region includes a concatenation component or an addition component, and/or a fully connected layer; and/or
- the learning including learning the first component, and then learning at least a part of the second component.

It is further provided a function learnable according to the method. In other words, the function constitutes a scheme that transforms inputs into an output, the scheme being obtainable by the method. The function may be used in a computer-implemented process for captioning a region of an image. The process may for example comprise providing an input image and an input region, and applying the function to generate an output caption based on the input image and the input region. The input region may for example be identified within the input image after the providing of the input the image, for example by a user or in any other way (for example by the process forming a dense captioning and the identification being performed with any classic region-identification stage of such dense captioning). The process may be repeated with different inputs, for example with the same function. The repetition may be executed over different regions of a same image identified with a dense captioning. Alternatively or additionally, the inputs may constitute a sequence of frames of a video, the process outputting captions of one or more regions in real-time for each frame.

It is further provided a computer program comprising instructions for performing the method and/or the process.

It is further provided a data structure comprising the function and/or the program.

It is further provided a computer readable storage medium having recorded thereon the data structure.

It is further provided a device comprising a data storage medium having recorded thereon the data structure. The device may form a non-transitory computer-readable medium. The device may alternatively comprise a processor coupled to the data storage medium. The device may thus form a system. The system may further comprise a graphical user interface coupled to the processor.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

By "computer-implemented", it is meant that steps (or substantially all the steps) are executed by at least one computer, or any system alike. Thus, steps are performed by the computer, possibly fully automatically, or, semi-automatically. In examples, the triggering of at least some of the steps may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 1:
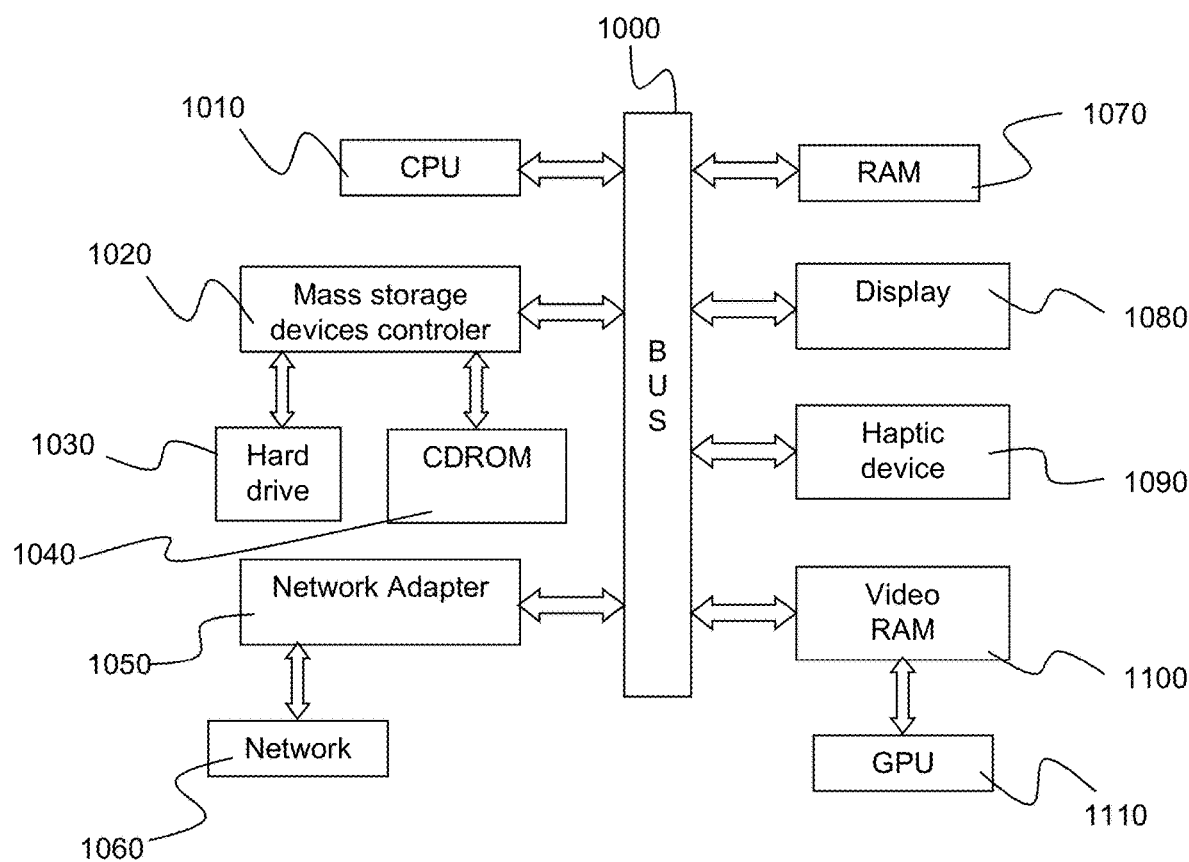
FIG. 1 shows an example of the system.

FIG. 1 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method is for learning a function configured for captioning a region of an image.

An image is a data structure that represents a spatial distribution of a physical signal, for example on a scene. The spatial distribution may be of any dimension, for example 2D or 3D. The spatial distribution may be of any shape, for example forming a grid and thereby defining pixels, the grid being possibly irregular or regular. The physical signal may be any signal, for example color or level of gray, such that the image may be an RGB image or a grayscale image. The image may be a synthetic image or alternatively a natural image such as a photo. The images of the dataset and/or input images contemplated to apply the function may all be a of a same type, for example all rectangular 2D RGB or grayscale images. Alternatively, a set of different image types may be contemplated.

A region of an image is any part of the image. A region is thus an image. The part may be connex and/or convex. The part may be a rectangle. The regions of the dataset and/or input regions contemplated to apply the function may all be of a same shape, for example all rectangles. Alternatively, a set of different region shapes may be contemplated.

A caption of an image is a textual representation of the content of the image. A caption may comprise or consist of a textual expression or sentence descriptive of such an image content. The function learned by the method is in specific adapted to generate an output caption based on an input image and on an input region of the input image. In other words, the function applies to an input image and to an input region of the input image, or yet in other words the function takes as inputs an image and a region of the image. The function then outputs a caption that describes the content of the input region, the output depending at least to some extent on the context of the region that is provided by the input image.

By "learning", it is meant that the method implements a machine learning process which consists in providing a dataset of inputs associated to outputs and then adjusting free weights of a weighted function (also called "neural network") such that the resulting function (i.e. the learned function, that is, the one corresponding to the final weights) best matches the dataset according to predetermined criteria. The adjustment may be performed in any known way, for example by minimizing a reconstruction loss evaluated by applying the weighted function to the inputs of the dataset and comparing the result to the outputs associated to these inputs in the dataset.

Now, in the case of the method, the weighted function is designed to apply to an input couple including an image and a region of the image so as to generate an output caption. In other words, the architecture of the learned function is pre-set to apply to both an input image and an input region of the input image (rather than to a single input image as in the prior art). Correspondingly, the dataset consists of triplets (i.e. ordered sets of three pieces of data) each including a respective image, a respective region of the respective image, and a respective caption of the respective region. In other words, the dataset associates, on the one hand, input images and respective input regions to, on the other hand, a corresponding caption. Such a dataset may be provided in any way, for example obtained by involving one or more users manually producing captions of image regions and/or retrieved from a datastore. As mentioned earlier, such datasets already exist as such.

Examples of implementation of the method are now discussed with reference to FIGS. 2-13. The examples discussed below provide optional aspects for the architecture of the function and optional aspects for the way to perform the learning, such aspects being combinable together.

In these examples, the method constitutes an improved approach for region description inside an image where the main focus is on the contextualization of the signatures of an image with their surroundings. As will be shown, the method may rely heavily on Deep Learning techniques which may present outstanding performances in image features extraction and natural language processing (NLP). Advantages of examples may include end-to-end learning architecture, no constraint required for the size of the input region image, and improved descriptions thanks to features contextualization.

In examples, the architecture of the function may be constrained such that the function includes a first component C1 configured to determine a signature of a combination of the input image and of the input region, and a second component C2 configured to generate the output caption based on the signature of the combination. The term "component" merely designates a sub-function that can be compounded with any other sub-function(s) to form the function. A component of a neural network is thus also a neural network. In other words, the function includes the compound of C1 and C2, C2 applying to the output of C1. The term "combination" designates, for initial pieces of information, another piece of information derived from the initial pieces of information. The signature of a combination is a vector that identifies the combination and distinguishes it from other pieces of information of the same type. A signature determined by C1 thereby identifies the content of an image region taking the content of the image itself into account, rather than the content of the image region only. As a consequence, a same content forming a region of two different images may be associated with different signatures. Conversely, different regions a same image with different contents may be associated with different signatures.

In examples, C1 includes a component C11 configured to extract a signature of the input image (i.e. independently of any other information), a component C11' configured to extract a signature of the input region (i.e. independently of any other information), and a component C12 configured to combine the signature of the input image with the signature of the input region. In such a case, the signature of the combination is a combination of signatures.

Any component configured to extract a signature of an image may be implemented for C11 and/or C11'. C11 and C11' may be equal (i.e. both apply the same process). C11 and/or C11' may each be a respective convolutional neural network (CNN). Such signature extractors are known to provide good and fast results when applied to images, in particular images forming regular grids. In examples further discussed later, the respective CNNs may share weights (i.e. the learning may be constrained such that the CNNs constituting C11 and C11' have the same architecture and the same weights, such that C11 and C11' are merely instances of a same and single neural network, which can be written as C11=C11'). This weight-sharing increases quality of the results.

C12 may perform any type of combination of information. In examples, C12 may include a concatenation component or an addition component, that is, a component that concatenates (e.g. in a predetermined order), or a component that adds together (i.e. vectorial addition, that is, dimension-wise addition of coordinates), the signatures outputted by C11 and C11', in other words the signatures of the region and of the image. In examples, C12 may further include a fully connected layer. Such examples of C12 lead to a good quality of the results.

An example of C12 including a concatenation component and a fully connected layer may be as following. The signature $x_i$ of the entire image and the signature $x_r$ of the region may be concatenated into a vector $(x_i, x_r)$ which is then passed through a Fully Connected layer, giving as output $y=\sigma(W(x_i, x_r)+b)$, with $\sigma$ a non-linearity, W a weight matrix and b a bias.

In examples, the learning may include learning C1, and then learning at least a part of C2 (e.g. the part that applies to the output of C1). The learning of C1 (resp. at least a part of C2) is performed independently of any other component of the function. C1 may be learned with images and regions of the initial dataset (e.g. disregarding all captions of the initial dataset). Once learned, C1 may be applied to at least a part of the images and regions of the initial dataset to create a new dataset of signatures (each of a combination of a respective image and of a respective region) each associated to a respective caption (according to the captions of the initial dataset). At least a part of C2 may then be learned based on this new dataset. In case C2 has other parts that also require a learning, such learning may be performed anytime, before, at the same time (i.e. in parallel) or after learning C1 and/or based on the initial dataset or other datasets. In other words, the learning is segmented. This increases speed of the learning and also leads to a good quality of the results.

This holds true in particular when the part of C2 thus learned after learning C1 comprises a recurrent neural network that takes as input the signature of the combination and participates to an iterative generation of the output caption. Recurrent neural networks are a well-known category of neural networks. In the case of the method, recurrent neural networks prove particularly efficient for iteratively generating a caption. In such a case, the learning may include training C1 (e.g. its CNNs, e.g. together when they share weights), and then only training such a recurrent neural network. This recurrent neural network is the "second recurrent neural network" described in the following examples.

In examples, the second component is configured to generate the output caption based on the signature of the combination and further based on a word embedding space. The word embedding space is a vectorial space where a word corresponds to a so-called word embedding vector. The second component may make use of such a word embedding space to generate the output caption.

For example, the second component may comprise a first recurrent neural network, a second recurrent neural network and a word embedding layer. These sub-components of the second component may interact as illustrated on FIG. 2, which shows an example of a function learnable by the method which meets this configuration.

Figure 2:
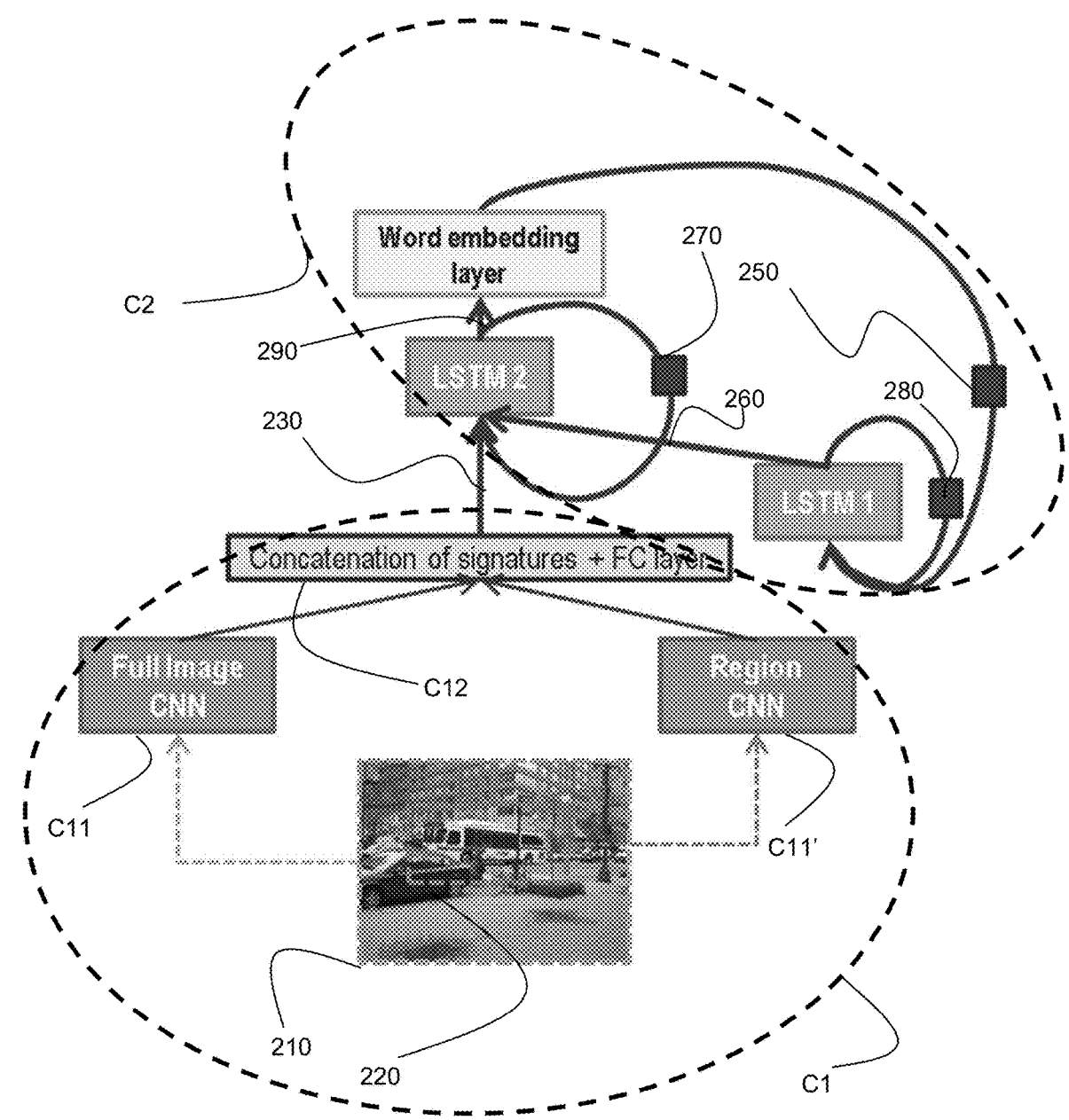
FIGS. 2, 3, 4, 5, 6, 7, 8, 9, 10, 11, 12 and 13 illustrate examples of the method.

In the example of FIG. 2, the first and second recurrent neural networks are Long Short-Term Memory (LSTM) neural networks, respectively noted LSTM1 and LSTM1, but the following discussion on FIG. 2 applies to other types of recurrent neural networks as well.

Also, in the example of FIG. 2, the function comprises a first component C1 and a second component C2 as described above. C1 is, as described in earlier examples, configured to determine a signature of a combination of an input image 210 and of an input region 220 of the image 210, thanks to C1 including a component C11 configured to extract a signature of the input image 210, a component C11' configured to extract a signature of the input region 220, and a component C12 configured to combine the signature of the input image with the signature of the input region. However, the following discussion on FIG. 2 applies to any other component configured to determine a signature of a combination of input image 210 and of input region 220. In the example, components C11 and C11' are CNNs but the following discussion on FIG. 2 applies to other signature extraction components as well. Component C12 concatenates the signatures inputted from C11 and C11' and further includes a fully connected (FC) layer, but the following discussions on FIG. 2 applies to other types of signature combination components as well.

LSTM1 is configured to recurrently generate a respective output word embedding vector 260 based on a respective input word embedding vector 250. The input word embedding vector 250 respective to LSTM1 is the output 250 of the compound of LSTM2 and then the word embedding layer. In other words, LSTM1 iteratively generates a respective output word embedding vector 260, each time based on what LSTM1 generated in the past (represented by recursion loop 280) and on an input word embedding vector 250 which is provided by the compound function, consisting of applying LSTM2 to an input 230,260 and then the word embedding layer to the output 290 of LSTM2.

LSTM2 is configured to recurrently generate a respective output word embedding vector 290 based on a respective input word embedding vector 260 and on the signature 230 of the combination. The input word embedding vector 260 respective to LSTM2 is the output 260 of LSTM1. In other words, LSTM2 iteratively generates a respective output word embedding vector 290, each time based on what LSTM2 generated in the past (represented by recursion loop 270), on an input word embedding vector 260 and on signature 230 (which is thus reused each time).

Now, the word embedding layer is configured to generate a respective output word embedding vector 250 based on a respective input word embedding vector 290. The generated word embedding vector 250 respective to the word embedding layer is the word embedding vector corresponding to a word of a vocabulary—the vocabulary being represented in the word embedding space—which is the word with highest probability (according to the input 290).

A vocabulary is a set of words that allows producing well-formed expressions such as captions. The vocabulary may belong to a single language. The vocabulary may be a set of words appearing in a set of captions, for example all or part (e.g. determined based on a number of occurrence criterion) of the words appearing in all or part of the captions of the initial dataset. The term vocabulary may also designate the set of word embedding vectors (with respect to the word embedding layer) representing such set of words. The vocabulary being represented in the word embedding space, each word of the vocabulary is associated by the word embedding layer to a known respective word embedding vector, such set of word embedding vectors being thereby predetermined.

The word embedding layer is a component that outputs based on such information a generated word embedding vector 250 which is the element of the set having a highest probability according to the input 290. The probability processing is known from classical word embedding layers in natural language processing. For example, the word embedding layer may be configured to output the probabilities of generation of each word of the vocabulary and then generate the word with highest probability according to the output probabilities.

Each word embedding vector outputted by the word embedding layer corresponding to a word of the vocabulary, the word embedding layer thereby determines sequentially a word of the vocabulary, the sequence of words forming a caption. In parallel to outputting word embedding vectors 250 for input to LSTM1, the word embedding layer may also output the corresponding caption word-by-word as each word is determined, or at once after the whole sequence is determined.

An example of a word embedding layer is discussed for the purpose of illustrating this well-known neural network. With $w_1, \ldots, w_N$ representations of the words in the word embedding space, each vector being of dimension d=128, and given an output h of dimension d=128, the output of the word embedding layer may be the vector of probability $p_1, \ldots, p_N$ with: $p_k = \exp(<w_k, h>)/\Sigma_i \exp(<w_i, h>)$. During the training, the representations of the different words in the word embedding (i.e. the parameters $w_1, \ldots,$ ) are learnt.

In the example of FIG. 2, LSTM1 on the one hand and the compound of LSTM2 and then the word embedding layer on the hand interact together and their recursive iterations are interlaced. As known from the field of language processing, for the first recursion, the one of LSTM1 and LSTM2 which is at the start of the iterative process (for example LSTM1) uses a constant indicative of this beginning situation for the first iteration instead of an input 250 per se (since no output is available to be provided by the other LSTM at this time), referred to by "beginning of sentence" or <BOS>. Also, the iterative process ends when LSTM2 outputs a constant indicative of the end, referred to by "end of sentence" or <EOS>.

The function represented by FIG. 2 may be learnt in any way. In examples, the learning may comprise learning the word embedding vectors of each word in the vocabulary. Those vectors are parameters in the word embedding layer. The learning may be performed by learning the word embedding layer jointly with LSTM1 based on a set of captions. Alternatively, the learning of the word embedding layer may be performed separately from the learning of LSTM1, both learning being performed based on a set of captions. In all cases, the set of captions may be a part of or all captions provided by the initial dataset. The method may comprise providing such a dataset of captions, the learning then including training LSTM1 and/or the word embedding layer with the dataset of captions, and then only training LSTM2 (based on a set of captions each associated to a respective image but also a signature). In other words, LSTM1 and/or the word embedding layer may be pre-learned to LSTM2. The training of LSTM1 and/or the word embedding layer may be performed before the training of LSTM2, and/or before or at the same time components of C1 (e.g. CNNs C11 and C11' and/or FC layer) are trained. LSTM2 may be trained after components of C1 (e.g. CNNs C11 and C11' and/or FC layer) are trained.

In examples, the function learned by the method may be included in a scene understanding and/or a dense captioning process. Dense captioning gathers all techniques used for automatically detecting the regions of interest in a media and describe those regions by a sentence. The method may be used for the description part of dense captioning, and thus assume that the region provided in the media is either selected by the user or obtained from an external detection algorithm.

As for other methods used in image captioning, the method is at the intersection of two fields:

Feature extraction for media representation: The media provided by the user may not be understandable by itself to the model that generates a sequence of words from it. One may have to retrieve from that media a signature with a process of feature extraction. Such features can either be engineered features obtained from descriptors, or they can be learned by machine learning models. Recent advances in deep learning and especially convolutional neural network for analyzing media like images or videos provide good results on feature learning.

Natural language processing: Many advances have been achieved in designing algorithms capable of understanding human language. The point of those models is to be able to understand human language and also to generate relevant sentences. Until recently, this was achieved with a lot of engineering by building models that integrate sentences parsers, retrieve the semantic representation and the dependency structure of a sentence (i.e. distinguishing the different part-of-speech tagging and their relationships). Recent advances in deep learning allow for all this process to be performed automatically by training a deep learning model that can learn the language rules. Such a model only has to be trained on a dataset of sentences of the specific language and then can be able to understand and generate sentences in that language.

In examples, the method makes efficient use of the above-mentioned recent advances in deep learning.

As for methods related to the field of dense captioning, the method falls within a framework which follows the same kind of pattern: it has an offline stage, in which intensive computations may be performed, and an online stage in which performance is the key as to reduce latency with the user to a minimum.

The online stage may be divided in two steps:

First the media provided by the user may be analyzed and a first process outputs a unique identifier of this media. This identifier is referred to as a "signature" or a "feature" in the art. For performance purposes the signature is usually a smaller dimensional representation of the media. For instance in song retrieval the signature might be a collection of the largest harmonics of the power spectrum of the recorded tune.

The signature is then transferred to a second process that generates a sentence from it. This is performed by a recurrent neural network that was trained to generate sentences. In the online stage, the generation of sentence is biased by the signature of the media which is given as input to the model. Thus the generated sentence is closely related to the media content and is interpreted as a description of the media.

In dense captioning, the quality and relevance of the sentences generated by the model may be very dependent on the quality of the database used during the training.

The offline stage can be considered as a two-tiered process, based on a provided dataset of triplets composed of an image, a region inside the image and a description of the region:

One may train a language model based on the language of the sentences. To do so, one may gather a database consisting of all the sentences from the database of triplets. Then one may preprocess the database by tokenizing the sentences and only keeping words that are frequent enough in the database: this will be the vocabulary of learning. The language model may then be trained on this preprocessed database and learn to generate sentences. The process of learning to generate sentences may basically consist in teaching the model to generate the most probable word following the previous words in a sentence. Thus, one may obtain a model that can generate sentences word after word.

One may train a feature extractor for the media. This extractor may build features from a media and put those features as input to the language model in order to generate the description.

In examples, the main goal of the function is to give the description of a region in an image in the form of a linguistic sentence. It may use the encoder-decoder framework in which an image is encoded into a lower dimension code, which is then decoded by a language model to generate a sequence of words. The method may leverage the efficiency of convolutional neural networks for 2D feature extraction in the encoder. For the decoder, the method may leverage the efficiency of recurrent neural networks for sequence generation.

Notions mentioned earlier and/or later are now discussed.

Dense captioning includes the problem of describing a region inside an image with a sentence (sequence of words) that is understandable by a human. It consists of learning the parameters of a model that will first extract a relevant signature of the region and then generate a sequence of words from that signature to describe the region at stake.

Deep Neural Networks (DNNs) are a powerful set of techniques for learning in Neural Networks (as described in paper "Rumelhart et al. *Learning internal representations by error backpropagation,* 1986") which is a biologically-inspired programming paradigm enabling a computer to learn from observational data.

Figure 3:
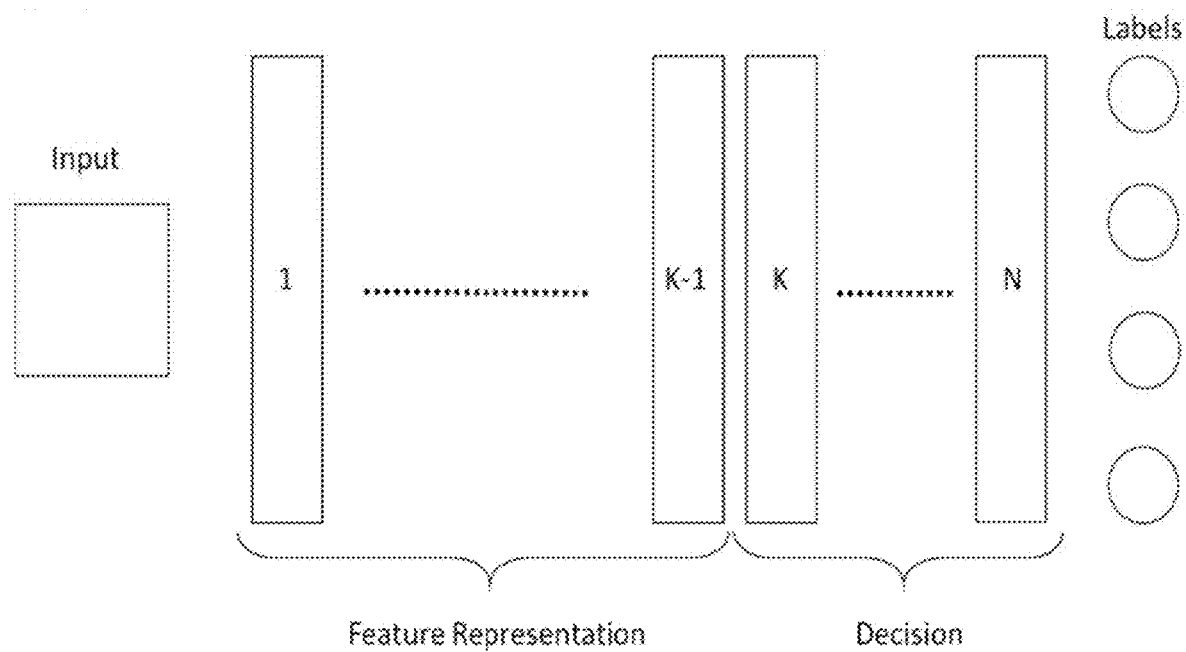

In image recognition, the success of DNNs is attributed to their ability to learn rich midlevel 2D image representations as opposed to hand-designed low-level features (Zernike moments, HOG, Bag-of-Words, SIFT, etc.) used in other image categorization methods (SVM, Boosting, Random Forest, etc.). More specifically, DNNs are focused on end-to-end learning based on raw data. In other words, they move away from feature engineering to a maximal extent possible, by accomplishing an end-to-end optimization starting with raw features and ending in labels. This is illustrated by FIG. 3 which shows an example of a Deep Neural Network.

Figure 4:
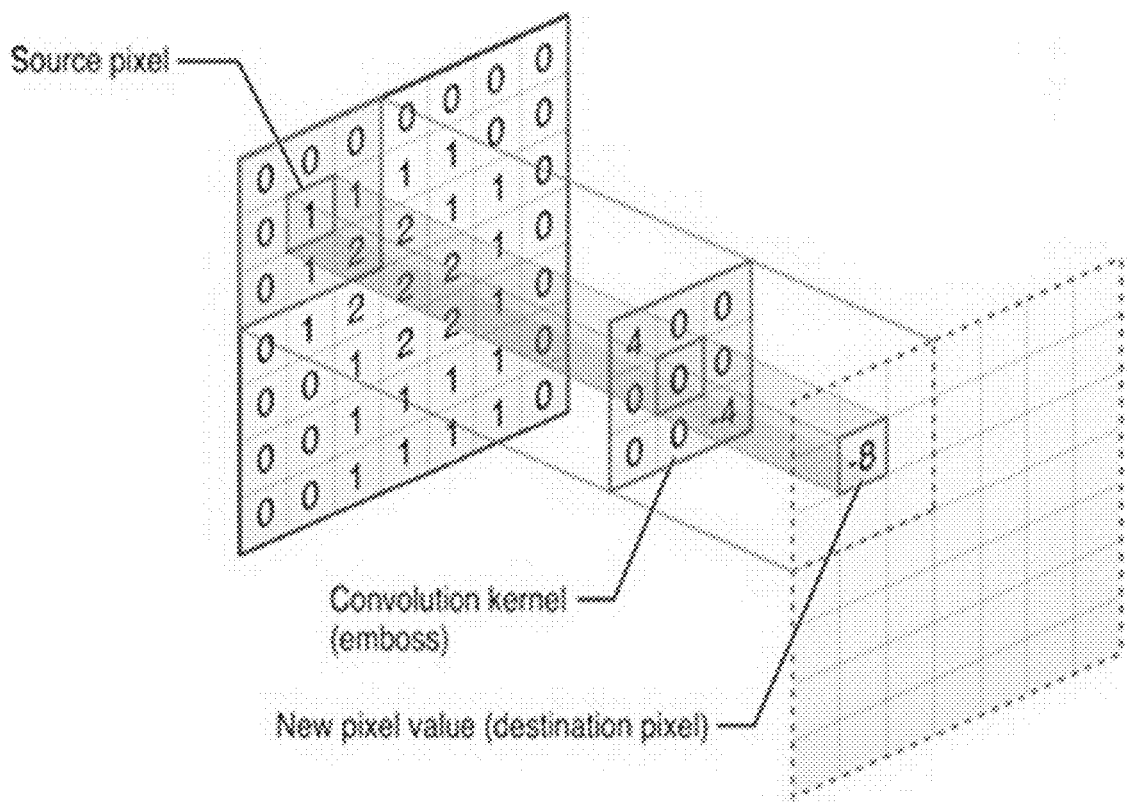

Convolutional Neural Networks (as described in paper "LeCun et al. *Convolutional Networks for Images, Speech, and Time-Series*") are a special case of Deep Neural Networks where the neurons of the lower layers are replaced by convolutional filters. This is illustrated by FIG. 4 which shows an example of a convolutional filter. Those filters are applied everywhere in the input and give as output a feature map. This feature map shows areas of activation where some specific patterns in the input were recognized by the filter. The advantage of Deep Learning, when stacking several convolutional layers, is to provide a way to extract very complicated but powerful features that are more sophisticated than basic features obtained by descriptors.

Recurrent Neural Networks (as described in paper "Graves, *Supervised Sequence Labelling with Recurrent Neural Networks*") are special types of Neural Networks which have shown interesting performances in temporal sequence processing. Their success is attributed to their ability to integrate feedbacks of previous states when doing predictions. This is performed by temporal loops in the neuron definition. Recent research on RNN led to integrate gates mechanisms into their definition. Those models (Long-Short Term Memory (LSTM), Gated Recurrent Unit (GRU)) have improved state-of-the-art performances by their memory integration and their ability to deal with the vanishing gradient problem.

In examples, the framework may decompose in two stages.

The first stage (which may be denoted as "offline" stage as mentioned above) may rely heavily on Deep Neural Networks, especially the use of Convolutional Neural Networks for feature extraction in the media and Recurrent Neural Networks for sentence generation from those features. The term "offline" refers to the fact that this stage may be transparent to the user of the method and even if one has large computational needs, time to do computations can be taken. During this part, the parameters of those networks may be learned and this may be performed for all. The learning process may be performed in two steps: first the parameters of the Recurrent Neural Network may be learned in order to have a language model and second the parameters of the Convolutional Neural Network may be learned jointly with the Recurrent Neural Network in order to understand how to extract contextual features to the media and adapt the learning of the Recurrent Neural Network with the feature extraction process.

The second stage (which may be denoted as "online" stage as mentioned above) gathers all the steps that are performed in real-time during the process of sentence generation from the region of the image.

Figure 5:
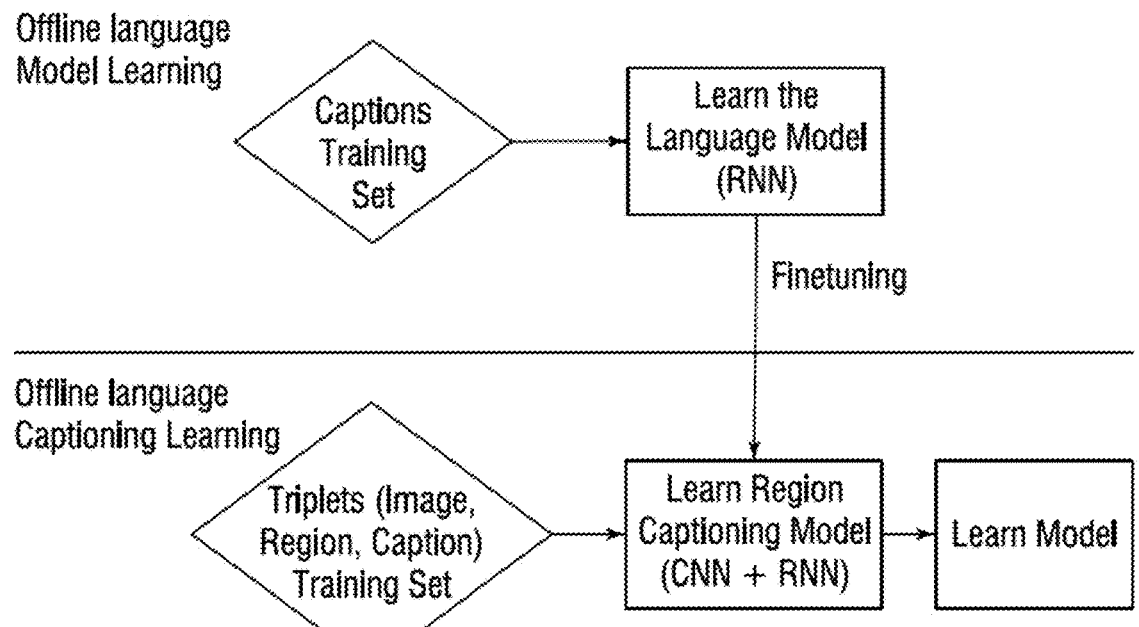
Figure 6:
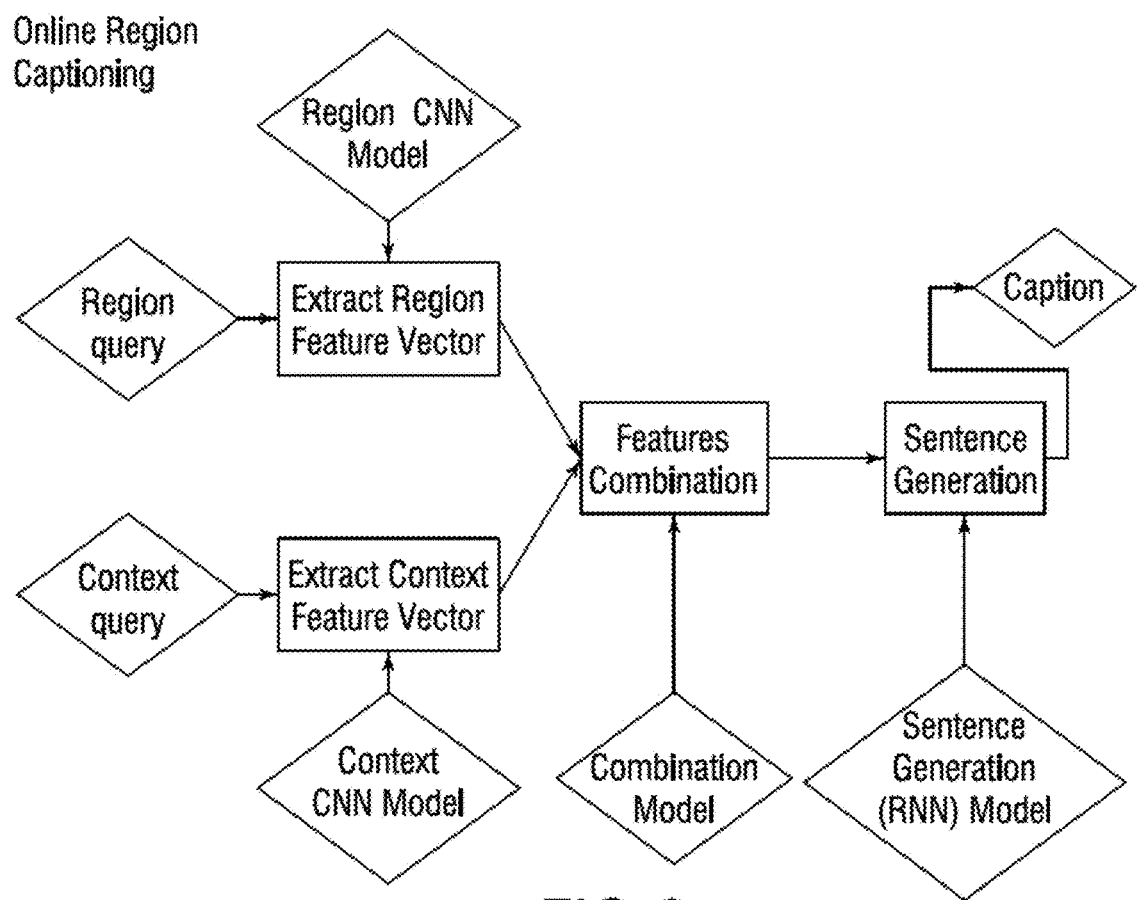

FIGS. 5 and 6 respectively illustrate an example technological workflow of the offline and the online stages.

Examples of language modeling are now discussed.

A first pillar of the Region Captioning process may be language modeling. The language may be learned from the captions describing the regions of the images. This may be learned with the maximum precision as possible to make sure the generated captions are correct and understandable by the human. Although the global architecture of the region captioning task can be learned in an end-to-end approach, it was found out that learning the language model apart and then fine-tuning the parameters into the global model leads to better performances.

In the end, the learning of the language model may be performed in two parts:

1. Preprocessing of the Captions from the Dataset
2. Training of a Recurrent Neural Network in a Generative Mode Examples of preprocessing of the captions from the dataset are now discussed.

Preprocessing of the captions from the dataset may allow the good learning of the parameters of the language model.

In the original dataset, the sentences may be in the form of strings. A tokenizer may first tokenize those sentences, i.e. separate the different words and put them in lower case. Indeed, in the computer point of view the strings "Car" and "car" may not be the same. Moreover, a lot of work may be done when designing the tokenizer because they may be configured to deal with the punctuation and the special words/acronyms. For instance, the tokenizer may have to consider "U.S." and "US" to be the same token.

Once the sentences are tokenized, a vocabulary may be designed for the language. This may mean that not all the words are learned by the model, but only words with a minimum frequency in the dataset. Indeed, it is easier for the model not to learn with relatively high relevance the meaning of words that appear infrequently.

Examples of training the language model on captions from the dataset are now discussed.

The training of the language model may be done by considering the Recurrent Neural Network as a generative model.

In an implementation, one may make use of the Long Short-Term Memory (LSTM) (e.g. as described in paper "S. Hochreiter et al. *Long short-term memory*"). LSTM are a particular type of Recurrent Neural Networks that have an explicit memory and gates mechanisms to interact with the memory when doing predictions. They demonstrated their efficiency in various domains implying temporal sequences, specifically in Natural Language Processing.

Several implementations of the LSTM units exist, they may differ by the peephole connections inside the unit or the number of gates. For instance the Gated Recurrent Unit (GRU) is a particular implementation with only two gates. The method may rather consider in a particularly efficient implementation the original LSTM implementation described in paper "S. Hochreiter et al. *Long short-term memory*". The method may have set the output dimension of the LSTM to be the dimension of the word embedding space of the language.

The following discusses the notion of word embedding.

In natural language processing, it would be too time consuming and not Computationally efficient to let the LSTM handle words represented by one-hot vectors (i.e. vectors of the size of the vocabulary with 0 everywhere except at the index of the word at stake). Indeed, in that case the size of the vector would be the size of the vocabulary, which would require too many parameters in the definition of the LSTM. Instead, what the method may do is to embed the words in some word embedding space. Such a space has interesting properties since it reflects the meaning of the words and clusters them by their meaning. The notion of word embedding really gained interest in 2013, especially with the launch of Word2Vec™ by Google. This is model learned on Google News™ with a specific approach called skip-gram with negative sampling (described in paper "T. Mikolov et al. *Distributed Representations of Words and Phrases and their Compositionally*"). Here the method may learn the word embedding with a different approach using the LSTM instead.

Having a word embedding combined with the LSTM may be helpful when interpreting the process of sentence generation of the LSTM. The process of predicting a word is the following:

The output of the LSTM is a point in the word embedding space.
The predicted word is then the word whose embedding representation is the closest to the predicted point.
The predicted word's embedding representation is then fed into the input of the LSTM to predict the next word.

Thus the method may learn the parameters of the LSTM combined with a word embedding during the training. Those parameters may be learned on a large number of captions from the dataset. This may be the training set for this specific task of language modeling training. No additional constraints are required for the captions since they may have been preprocessed with tokenization and vocabulary restriction definition.

The contextual feature extraction operated by the function is now discussed.

A second fundamental pillar in region captioning may be the feature extraction from the media. This feature may then be later given as input to the LSTM in order to bias the sentence prediction of the LSTM and make it generate a sentence describing the region. A main contribution of the method here may be to consider a feature of the region of interest that is contextualized by the surrounding of the region in the media. The method thus obtains a contextual feature of the region of interest in the media and it is richer since it takes into account the information from the surrounding of the region.

Examples of extracting feature vectors are now discussed.

The feature extraction process of a media is a challenging task with several possible approaches. Before the introduction of Deep Learning, this was done with descriptors such as SIFT or SURF that gave engineered features. Originally those features gave a low-level signature of the image: the descriptors give feature maps showing activated areas in the image where low-level elements like object contours were detected.

Deep Learning advances make it now possible to learn features from images. It is now also possible to go really deep in the definition of features thanks to the large number of layers that can be stacked in neural networks.

In an implementation, the method may make use of Convolutional Neural Networks (e.g. as described in paper "Y. Lecun et al. *Backpropagation applied to handwritten zip code recognition*, Neural Comput, 1989"). CNNs are neural networks that use convolution in place of general matrix multiplication and have demonstrated their efficiency to recognize objects from complex scenes in images with cluttered background and multiple other objects.

More specifically, the method may implement the CNN that won the classification task of ILSVRC 2012, the task of recognizing the category of the object present in the image among 1000 categories. It is called AlexNet and described in paper "Alex Krizhevsky, *ImageNet Classification with Deep Convolutional Neural Networks*, NIPS 2012") However, the method may adapt such network to the specific task at hand by removing the layers above the eighth fully connected layer (FC8 in the literature) because that layer was designed to be of dimension 1000 in the ILSVR Challenge which was a challenge of classifying objects from 1000 categories. Thus in the end, the truncated version of AlexNet network the method may consider consists of 5 convolutional layers (with pooling and normalization) and 2 fully-connected layers. And the last layer of the truncated AlexNet (namely FC7) contains 4096 neurons, thus the feature vector for an image will be a 4096-dimensional vector.

Examples of combining the features from the region and the surrounding are now discussed.

When one only takes into account the information inside the region of interest when designing the signature of the region, one is missing a lot of information given by the context of the region. This is especially true when the size of the region in the image is small: in that case the CNN would not capture very rich features.

To improve the quality of the region feature, the method may thus combine it with context feature extracted at the surrounding of the region in the image. This is done by combining the feature extracted by a first CNN (which may be called region-CNN) from the region image and the feature extracted by a second CNN (which may be called the context-CNN) from the image comprising the region and its surrounding area.

Several methods can be used when combining the different features. Among them the method may implement:

Concatenation: the feature vector of the region and the feature vector of the surrounding area are concatenated into a vector that represents the contextual feature vector.
Addition: the feature vector of the region and the feature vector of the surrounding area are summed into a vector that represents the contextual feature vector.
Use of a Fully Connected layer: the feature vector of the region and the feature vector of the surrounding area are concatenated into a vector and a fully connected layer is added on top of the concatenation. This results in another vector that represents the contextual feature vector.

Figure 7:
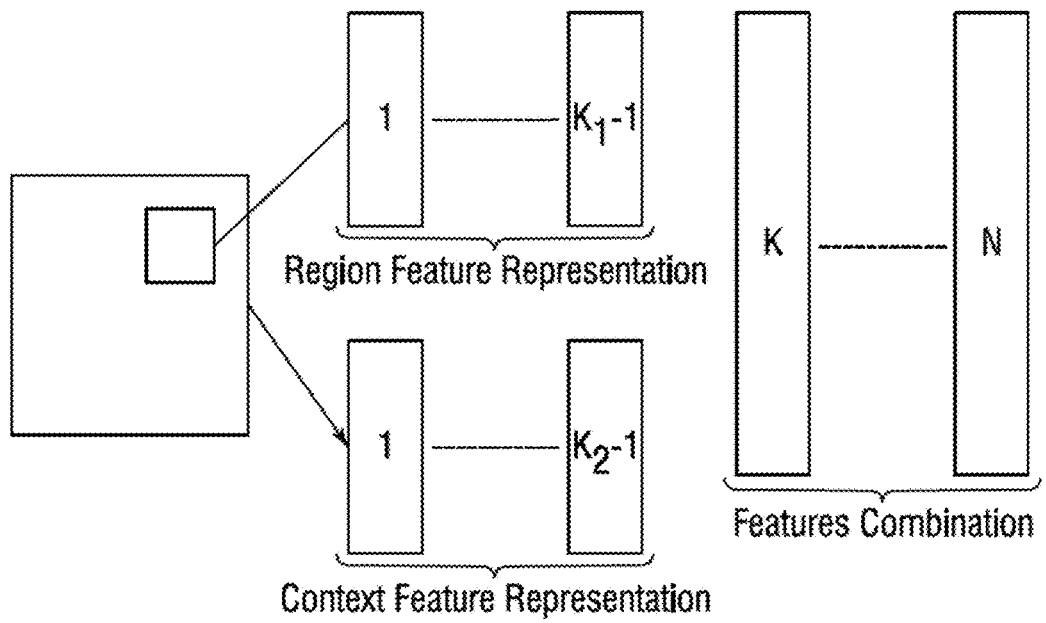

FIG. 7 illustrates this process of combining features at the neural network architecture level.

Examples of how to train the model end-to-end for both features extraction and language modeling are now discussed.

The training of the features extraction and combination in the network may be performed jointly with the training of the LSTM from the language modeling part. All of this may be done in an end-to-end manner. The method may just fine tune the parameters of the LSTM from the parameters that were learned with the language modeling part alone. Thus in this part of the training, the entire model may be learned in order to generate the captions from the region and surrounding context given as input.

The parameters of the network may thus be learned on a large number of images with regions specified inside and captions describing those regions. Such a set of triplets (entire image, region image, caption) represents a training dataset. No constraints may be required here for the size of images or the captions properties, since the captions have been preprocessed in the same way described above when discussing language modeling.

Figure 8:
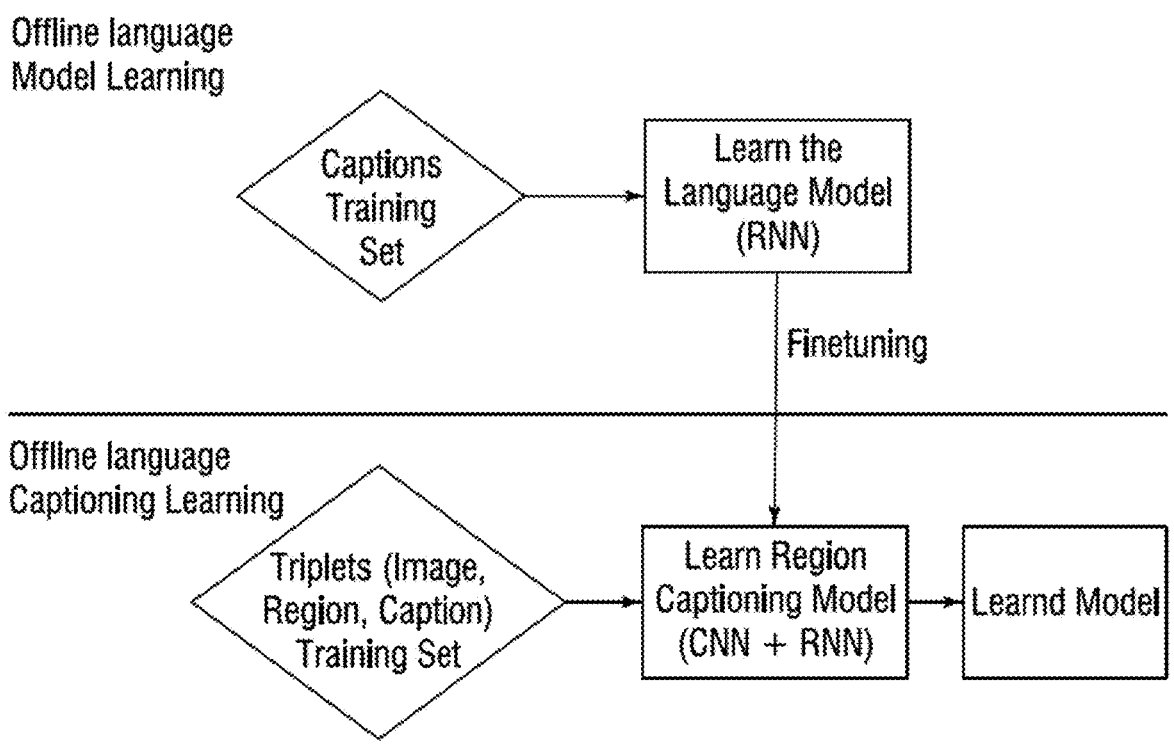
Figure 9:
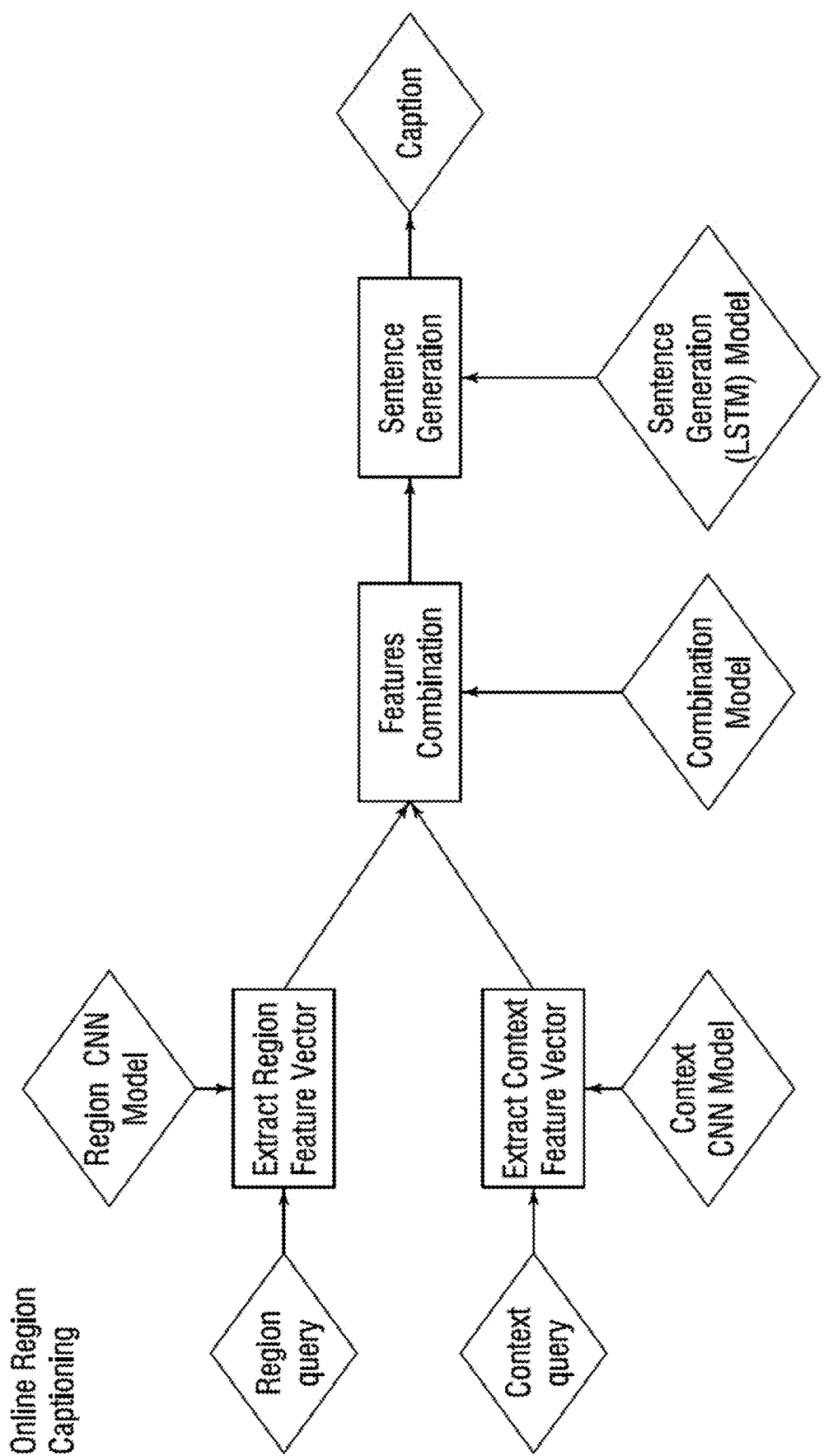

An example of how to put all the above example stages together is now discussed, referring to FIGS. 8-9 which respectively represent an offline stage example and a corresponding online stage example.

The final process may integrate a contextual features extraction process and a language model. The learning of the entire model may be done in an end-to-end process. However, the language model may first be learned in with the database of captions and then the learned weights are finetuned to the LSTM part of the architecture. When one combines the two processes, the contextual feature vector of combined features extracted from the region and the context is given as input to the language model in order to bias the prediction of the sentence with the information given by this vector. Thus, the generated sentence is strongly correlated with the information brought by the region and its context and then gives a description of the region reinforced by the information brought by the context. All of the details for training is shown on FIG. 8. Testing the model is shown in the online stage in FIG. 9.

Figure 10:
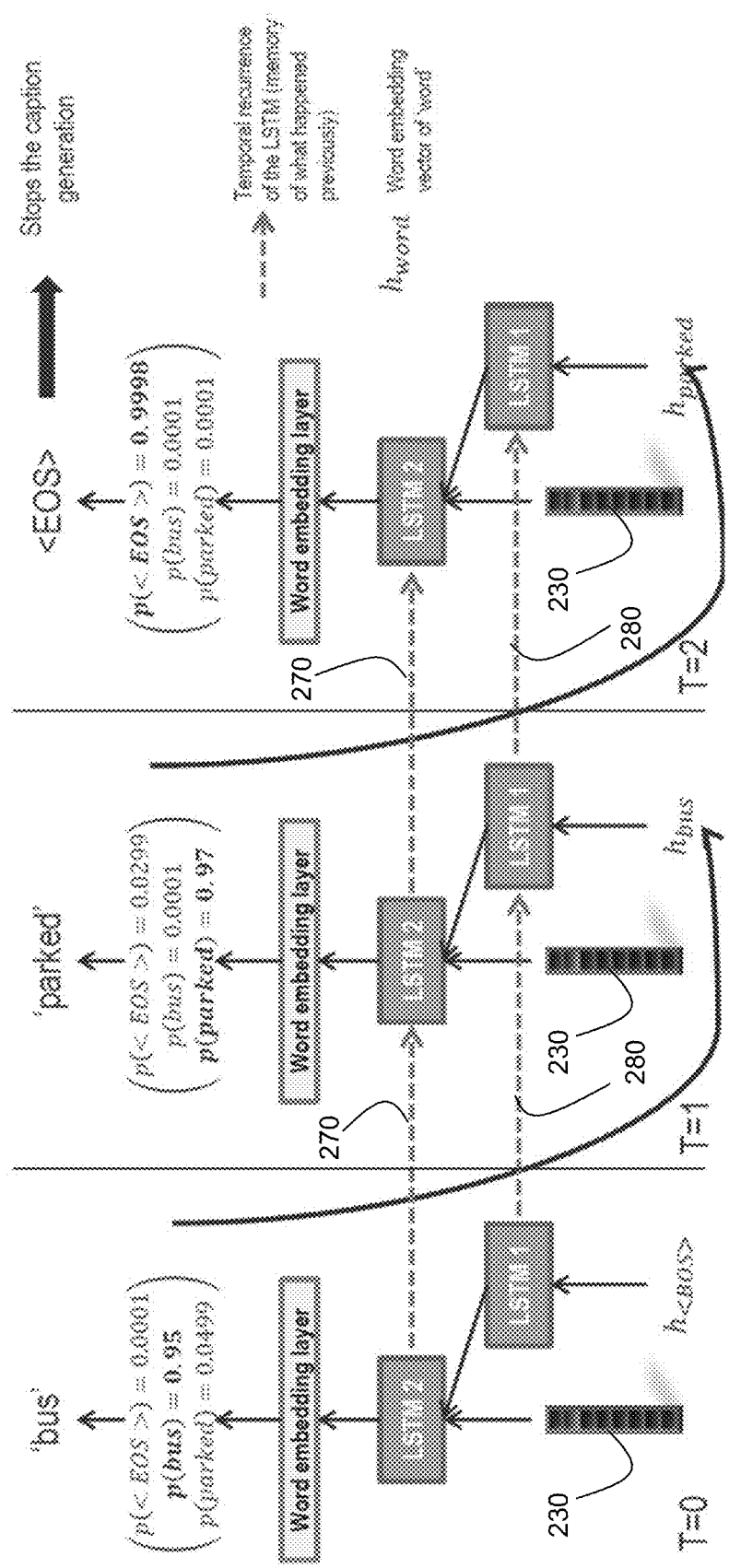

FIG. 10 schematically shows a simplified example of an online stage in line with the example of FIG. 2.

At T=0 (i.e. first iteration), the word embedding vector $h_{<BOS>}$ indicative of a beginning of sentence is inputted to LSTM1 to initialize the captioning process. The output of LSTM1 is passed as an input to LSTM2, which is also provided with the signature 230 of the combination as another input. LSTM2 then outputs a word embedding vector which is inputted to the word embedding layer, which in turn outputs a vector of probabilities of generation of each word of the vocabulary (the vocabulary being reduced to the three words "<EOS>", "bus" and "parking" for the sake of keeping the example simple). The word "bus" is then generated as it is the one with highest probability.

At T=1 (second iteration), the word embedding vector of the word "bus" is inputted to LSTM1, which outputs a result based on this and on its past outputs (represented by numeral reference 280) to LSTM2, which itself bases upon that, upon signature 230 and its past (represented by numeral reference 270) to output a vector to the word embedding layer which will generate the word "parked".

At T=2 (last iteration), the same process is executed to observe that the output of the word embedding layer is <EOS> indicative of the end of the process.

The process is thus ended at this point with caption "bus parked" generated by the function, corresponding to region 220 of image 210 of FIG. 2.

Figure 11:
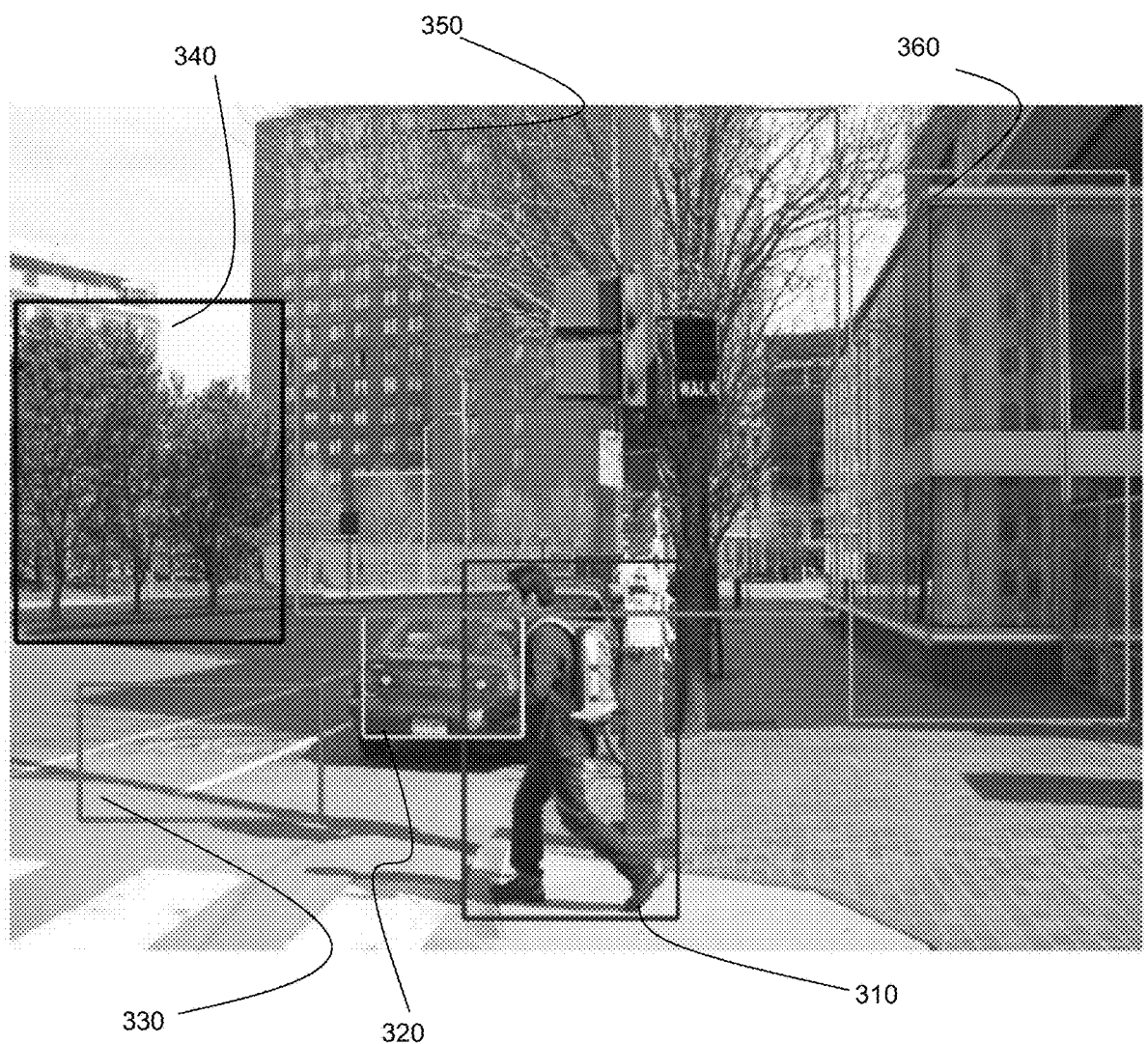
Figure 12:
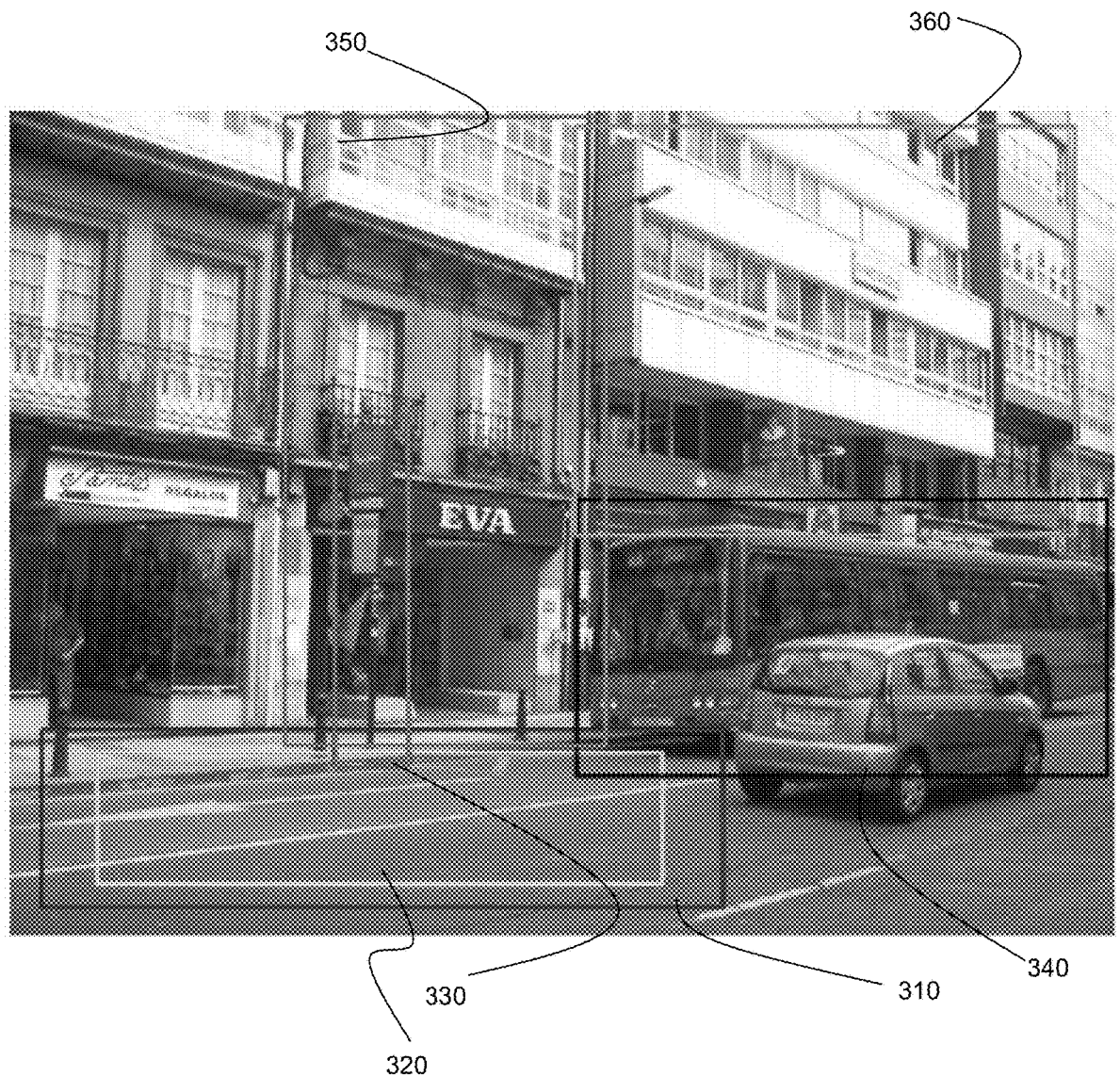
Figure 13:
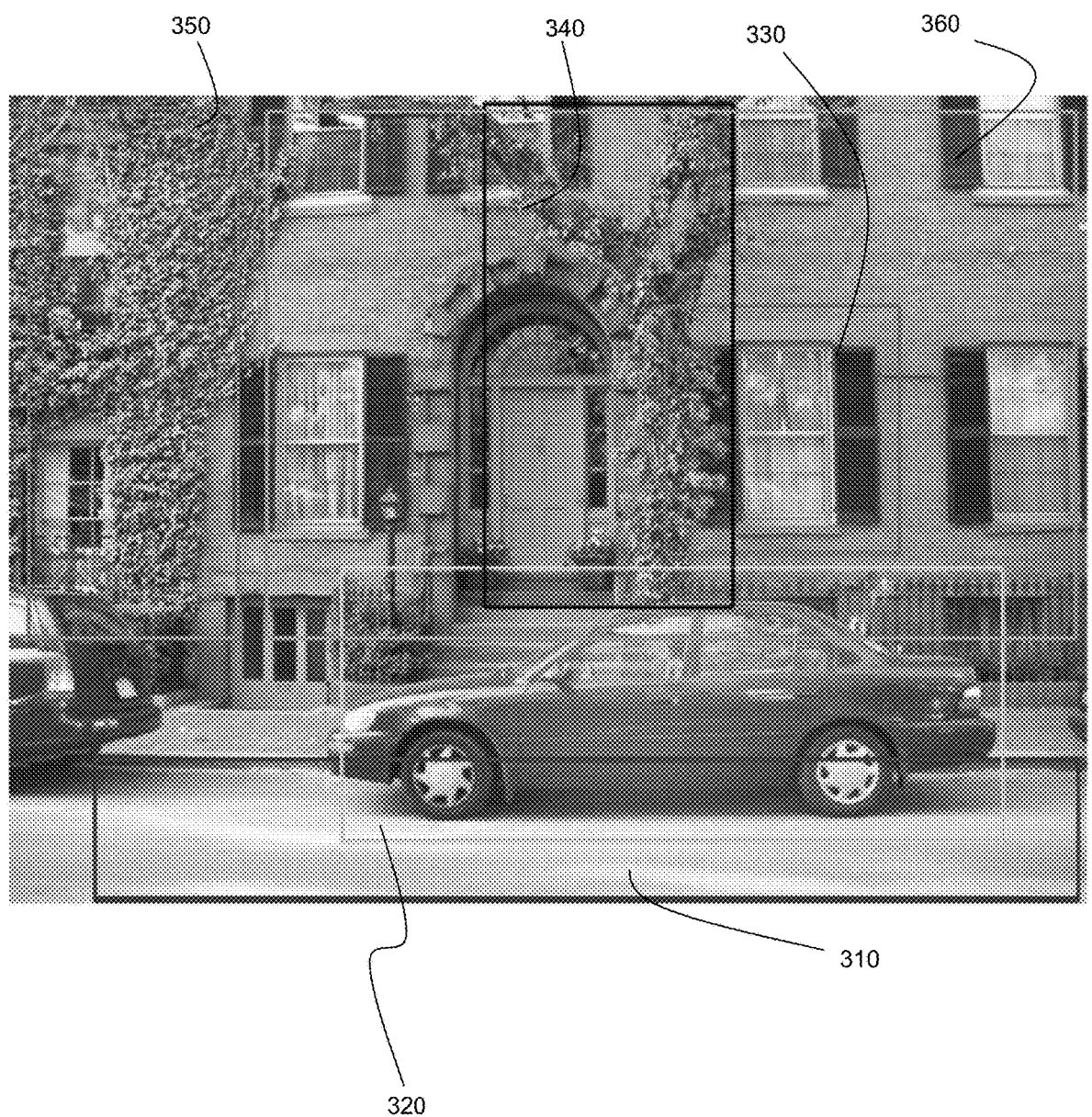

FIGS. 11-13 each show a respective image, each with respective regions 310-360. Tables I-III below provide captions outputted by implementations of the method on those images and regions (one with the use of concatenation for the combination of signatures, and the other one with the use of addition for the combination of signatures), compared to captions outputted by an implementation of the prior art (LRCN, i.e. uncontextualized region signatures). As can be seen, the captions generated by the method are of a better quality.

TABLE I captions generated for regions of the image of FIG. 11

| Region | LRCN | Contextual Features: COncatenation | Contextual Features: Addition |
|---|---|---|---|
| 310 | A black and white dog | A man wearing a black jacket | A man wearing a black jacket |
| 320 | A black and white cat | A red car | A black and white dog |
| 330 | The floor is tiled | A white line on the road | A white line on the road |
| 340 | A tree with no leaves | A tree in the background | A tree with green leaves |
| 350 | The trees are bare | A tree with no leaves | A large tree in the background |
| 360 | A large window | A large building | A building with a large clock |

TABLE II captions generated for regions of the image of FIG. 12

| Region | LRCN | Contextual Features: COncatenation | Contextual Features: Addition |
|---|---|---|---|
| 310 | The train is black | A sidewalk | A white line on the road |
| 320 | The floor is tiled | A white line on the road | A white line on the road |
| 330 | A wall on the side of a building | A black and white street sign | A black and white photo |
| 340 | A black and white photo | A bus on the street | A bus on the road |
| 350 | A large building | A large building | A large building |
| 360 | A train on the tracks | A white building | A large building |

TABLE III captions generated for regions of the image of FIG. 13

| Region | LRCN | Contextual Features: COncatenation | Contextual Features: Addition |
|---|---|---|---|
| 310 | A white toilet | The road is wet | A wall on the side of a building |
| 320 | A black and white photo | A black car parked on the side of the road | A car parked on the street |
| 330 | A large window | A large window | A window on a building |
| 340 | A tree with no leaves | A tree with green leaves | A tree with green leaves |
| 350 | A tree in the background | Green trees in the background | A tree with green leaves |
| 360 | A large building | A large brick buliding | A large brick building |

Table IV shows a comparison based on different metrics a metric mentioned earlier between different implementations of the method (and an implementation of the prior art LRCN).

The function was learnt based on the database "Visual Genome" with subregions>100 px (all models represented in the table were thus trained and tested on this database).

The different NLP evaluation metrics are set to evaluate the quality of the generated captions in comparison with the reference captions in the test set, which have been generated by humans.

Bleu-n (n=1 . . . 4): This is a popular NLP evaluation metric that computes a quantity which is the proportion of n-grams appearing both in the generated captions and in the reference captions. a penalization coefficient that penalizes too short sentences is multiplied to this quantity.

METEOR: This is a language specific evaluation metric. It compares the candidate sentence and the generated sentence with an word-to-word matching that is sensitive to word synonymy.

Rouge-L: This is a metric that compares a candidate sentence and a generated sentence by looking at the longest common subsequence between the two.

CIDEr: This is a consensus based evaluation metric where the words in the sentences are transformed in root forms and the set of n-grams of those transformed sentences are compared.

As can be seen, the method generally performs better than the prior art. Also, it appears that particularly good results are provided by the earlier-described implementation consisting of CNNs sharing weights for extracting a signature of the image and of the region, followed by concatenation of the two signatures and then followed by a fully connected layer.

TABLE IV

Comparison of different implementations

| Metric | LRCN-2f-fc7 | Contextual features: concatenation | Contextual features: addition | Contextual features: concat + FC | Addition with shared weights | Concat + FC with shared weights |
|---|---|---|---|---|---|---|
| Bleu-1 | 0.187 | 0.205 | 0.218 | 0.238 | 0.218 | 0.244 |
| Bleu-2 | 0.081 | 0.093 | 0.104 | 0.118 | 0.105 | 0.123 |
| Bleu-3 | 0.044 | 0.051 | 0.058 | 0.068 | 0.059 | 0.071 |
| Bleu-4 | 0.030 | 0.031 | 0.036 | 0.041 | 0.036 | 0.045 |
| METEOR | 0.069 | 0.082 | 0.088 | 0.104 | 0.091 | 0.104 |
| ROUGEL | 0.175 | 0.192 | 0.206 | 0.228 | 0.209 | 0.232 |
| CIDEr | 0.333 | 0.425 | 0.482 | 0.625 | 0.507 | 0.627 |

The invention claimed is:

1. A computer implemented method for learning a function configured for captioning a region of an image, the method comprising:
   obtaining a dataset of triplets each including a respective image, a respective region of the respective image, and a respective caption of the respective region; and
   learning, with the dataset of triplets, a function that is configured to generate an output caption based on an input image and on an input region of the input image, wherein the function includes:
      a first component, the first component being configured to determine a signature of a combination of the input image and of the input region, and
      a second component, the second component being configured to generate the output caption based on the signature of the combination,
   wherein the second component is configured to generate the output caption further based on a word embedding space,
   wherein the second component comprises a first recurrent neural network, a second recurrent neural network and a word embedding layer.
   wherein the first recurrent neural network is configured to recurrently generate a respective output word embedding vector based on a respective input word embedding vector, the input word embedding vector respective to the first recurrent neural network being the output of the compound of the second recurrent neural network and then the word embedding layer,
   wherein the second recurrent neural network is configured to recurrently generate a respective output word embedding vector based on a respective input word embedding vector and on the signature of the combination, the input word embedding vector respective to the second recurrent neural network being the output of the first recurrent neural network, and wherein the word embedding layer is configured to generate a respective output word embedding vector based on a respective input word embedding vector, the generated word embedding vector respective to the word embedding layer being the word embedding vector corresponding to a word of a vocabulary represented in the word embedding space which is the word with highest probability.

2. The method of claim 1, wherein the second component is configured to generate the output caption iteratively.

3. The method of clam 2, wherein the second component includes one or more recurrent neural networks.

4. The method of claim 3, wherein the one or more recurrent neural networks comprise one or more Long Short-Term Memory neural networks.

5. The method of claim 1, wherein the method further comprises:
obtaining a dataset of captions, the learning including training the first recurrent neural network and/or the word embedding layer with the dataset of captions, and then training the second recurrent neural network.

6. The method of claim 1, wherein the first component includes:
a component configured to extract a signature of the input image,
a component configured to extract a signature of the input region, and.
a component configured to combine the signature of the input image with the signature of the input region.

7. The method of claim 6, wherein the component configured to extract a signature of the input image and the component configured to extract a signature of the input region, are respective convolutional neural networks.

8. The method of claim 7, wherein the respective convolutional neural networks share weights.

9. The method of claim 6, wherein the component configured to combine the signature of the input image with the signature of the input region includes a concatenation component or an addition component, and/or a fully connected layer.

10. The method of claim 1, wherein the learning includes learning the first component, and then learning at least a part of the second component.

11. A device comprising:
processing circuitry, and
a non-transitory storage having stored thereon a data structure, the data structure comprising a function learnable according to a computer implemented method for learning a function configured for captioning a region of an image, the method when implemented by the processing circuitry causes the processing circuitry to be configured to:
obtain a dataset of triplets each including a respective image, a respective region of the respective image, and a respective caption of the respective region, and
learn, with the dataset of triplets, a function that is configured to generate an output caption based on an input image and on art input region of the input image, wherein the function includes:
a first component, the first component being configured to determine a signature of a combination of the input image and of the input region, and
a second component, the second component being configured to generate the output caption based on the signature of the combination,
wherein the second component is configured to generate the output caption further based on a word embedding space,
wherein the second component comprises a first recurrent neural network, a second recurrent neural network and a word embedding layer, wherein the first recurrent neural network is configured to recurrently generate a respective output word embedding vector based on a respective input word embedding vector, the input word embedding vector respective to the first recurrent neural network being the output of the compound of the second recurrent neural network and then the word embedding layer,
wherein the second recurrent neural network is configured to recurrently generate a respective output word embedding vector based on a respective input word embedding vector and on the signature of the combination, the input word embedding vector respective to the second recurrent neural network being the output of the first recurrent neural network, and
wherein the word embedding layer is configured to generate a respective output word embedding vector based on a respective input word embedding vector, the generated word embedding vector respective to the word embedding layer being the word embedding vector corresponding to a word of a vocabulary represented in the word embedding space which is the word with highest probability.

12. The device of claim 11, wherein the storage is a non-transitory computer-readable medium.

13. The device of claim 11, wherein the storage is a memory, and wherein the device further comprises the processing circuitry coupled to the memory.

14. A device comprising:
processing circuitry; and
a non-transitory storage having stored thereon a computer program including instructions for performing a computer implemented method for learning a function configured for captioning a region of an image, the method when implemented by the processing circuitry causes the processing circuitry to be configured to:
obtain a dataset of triplets each including a respective image, a respective region of the respective image, and a respective caption of the respective region; and
learn, with the dataset of triplets, a function that is configured to generate an output caption based on an input image and on an input region of the input image, wherein the function includes:
a first component, the first component being configured to determine a signature of a combination of the input image and of the input region, and
a second component, the second component being configured to generate the output caption based on the signature of the combination,
wherein the second component is configured to generate the output caption further based on a word embedding, space,
wherein the second component comprises a first recurrent neural network, a second recurrent neural network and a word embedding layer,
wherein the first recurrent neural network is configured to recurrently generate a respective output word embedding vector based on a respective input word embedding vector, the input word embedding vector respective to the first recurrent neural network being the output of the compound of the second recurrent neural network and then the word embedding layer, wherein the second recurrent neural network is configured to recurrently generate a respective output word embedding vector based on a respective input word embedding vector and on the signature of the combination, the input word embedding vector respective to the second recurrent neural network being the output of the first recurrent neural network, and wherein the word embedding layer is configured to generate a respective output word embedding vector based on a respective input word embedding vector, the generated word embedding vector respective to the word embedding layer being the word embedding vector corresponding to a word of a vocabulary represented in the word embedding space which is the word with highest probability.

15. The device of claim 14, wherein the storage is a non-transitory computer-readable medium.

16. The device of claim 14, wherein the storage is a memory, the device further comprising the processing circuity coupled to the memory.

* * * * *